US008825511B2

(12) United States Patent
Hamilton et al.

(10) Patent No.: US 8,825,511 B2
(45) Date of Patent: *Sep. 2, 2014

(54) SMART REMINDER MANAGEMENT

(75) Inventors: Rick A. Hamilton, Charlottesville, VA (US); James R. Kozloski, New Fairfield, CT (US); Clifford A. Pickover, Yorktown Heights, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,758

(22) Filed: Sep. 12, 2012

(65) Prior Publication Data

US 2014/0074534 A1 Mar. 13, 2014

Related U.S. Application Data

(63) Continuation of application No. 13/611,397, filed on Sep. 12, 2012.

(51) Int. Cl.
*G06Q 10/00* (2012.01)
(52) U.S. Cl.
USPC .......................................... 705/7.21
(58) Field of Classification Search
USPC .......................................... 705/7.21
See application file for complete search history.

(56) References Cited

U.S. PATENT DOCUMENTS

| | | | |
|---|---|---|---|
| 6,567,785 B2 | 5/2003 | Clendenon | |
| 6,604,059 B2 | 8/2003 | Strubbe et al. | |
| 6,961,896 B1 * | 11/2005 | Rousselle et al. | 715/205 |
| 7,334,000 B2 * | 2/2008 | Chhatrapati et al. | 1/1 |
| 7,385,875 B2 * | 6/2008 | May et al. | 368/10 |
| 7,522,640 B2 * | 4/2009 | Date et al. | 370/507 |
| 7,925,525 B2 | 4/2011 | Chin | |
| 2002/0067308 A1 * | 6/2002 | Robertson | 342/357.17 |
| 2009/0133069 A1 | 5/2009 | Conness et al. | |
| 2009/0149166 A1 | 6/2009 | Habib et al. | |
| 2009/0254944 A1 | 10/2009 | Watson et al. | |
| 2010/0145262 A1 | 6/2010 | Bengtsson et al. | |
| 2010/0188230 A1 * | 7/2010 | Lindsay | 340/573.1 |
| 2010/0317371 A1 | 12/2010 | Westerinen et al. | |

OTHER PUBLICATIONS

Send Me a Reminder, "Intelligent Software Agents," http://www.sendmereminder.com/news.php, May 9, 2009, downloaded, Aug. 8, 2011.
Dey et al., "CybreMinder: A Context-Aware System for Supporting Reminders," Lecture Notes in Computer Science; vol. 1927, Proceedings of the 2nd international symposium on Handheld and Ubiquitous Computing, Bristol, UK, 2000, pp. 172-186.

(Continued)

*Primary Examiner* — Andre Boyce
(74) *Attorney, Agent, or Firm* — Ryan, Mason & Lewis, LLP

(57) ABSTRACT

A system and article of manufacture for smart reminder management include receiving input pertaining to a user task for which a schedule reminder is to be managed, automatically determining a timing and repetition management scheme for the schedule reminder based on a user model, analysis of current user context and a model of oscillators, determining a confidence level for the schedule reminder, associating the confidence level with the timing and repetition management scheme, and conveying the schedule reminder to the user in accordance with the timing and repetition management scheme.

20 Claims, 2 Drawing Sheets

(56) References Cited

OTHER PUBLICATIONS

Byun et al., "Exploiting User Models and Context-Awareness to Support Personal Daily Activities," UM2001 Workshop on User Modeling for Context-Aware Applications, Sonthofen, Jul. 2001.

Kamar et al., "Investigation of Principles of Context-Sensitive Renninding,".Technical report, MSR-TR-2010-174, Microsoft Research, Oct. 2010, 19 pages.

Li et al., "Evaluating Location-Based Reminders," Technical Report CS2005-0826, University of California, San Diego, May 18, 2005, downloaded Aug. 8, 2011, 4 pages.

Kaushik, "The design and evaluation of a mobile handheld intervention for providing context-sensitive medication reminders," Masters Thesis, Sep. 2005.

* cited by examiner

SMART REMINDER MANAGEMENT

CROSS-REFERENCE TO RELATED APPLICATIONS

This application is a continuation of U.S. patent application Ser. No. 13/611,397, filed Sep. 12, 2012, and incorporated by reference herein.

FIELD OF THE INVENTION

Embodiments of the invention generally relate to information technology, and, more particularly, to cognitive assistance technology.

BACKGROUND

People routinely schedule electronic reminders on stationary or mobile computing devices. This may include reminders for coming due dates, tasks that need to be performed during the same day or in a coming day, important pieces of information requiring repeated attention, etc. Different individuals have different needs with respect to such scheduling and reminding, but existing approaches necessitate each individual manually creating and arranging such items of information. Accordingly, a need exists for automated management of a reminder system.

SUMMARY

In one aspect of the present invention, techniques for smart reminder management are provided. An exemplary computer-implemented method for automatically managing a schedule reminder can include steps of receiving input pertaining to a user task for which a schedule reminder is to be managed, automatically determining a timing and repetition management scheme for the schedule reminder based on a user model, analysis of current user context and a model of oscillators, determining a confidence level for the schedule reminder, associating the confidence level with the timing and repetition management scheme, and conveying the schedule reminder to the user in accordance with the timing and repetition management scheme.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
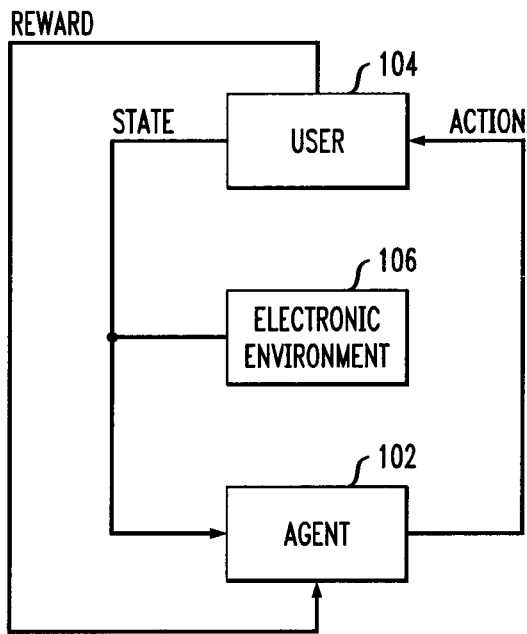
FIG. 1 is a block diagram illustrating an example embodiment, according to an aspect of the invention.

As described herein, an aspect of the present invention includes smart reminder management. At least one embodiment of the invention includes providing a system in which the timing and repetition associated with schedule reminders are automatically learned and determined based on a user model, analysis of the user's current context (including other reminders), and models of other (potentially related) users, along with corresponding contexts and reminders.

For example, a reminder occurring one day in advance of a milestone may be acceptable for a particular task and a particular type of user; however, a reminder occurring one hour in advance may be appropriate for other tasks and other users. Similarly, for example, a non-recurring reminder of time and place can be delivered once, shortly before an event, while reminders regarding ongoing needs that require continued thought and/or action may be delivered periodically. Accordingly, an aspect of the invention includes determining delays and periodicity automatically with confidence levels determined using inference in probabilistic models and information-theoretic computations.

Similarly, at least one embodiment of the invention includes determining phase, frequency, and amplitude of a set of coupled periodic reminders (which may potentially collide in time in an undesirable fashion), and changing the period and phase of the user reminder cycle by means of mathematical techniques derived from models of nonlinear oscillators.

In an example embodiment of the invention that includes minimizing collisions of reminders, consider three example reminders for tasks that need to be completed, with such reminders possibly falling within one minute of one another. In such a scenario, the system may change the phases P slightly with respect to such reminders, which may be useful so as not to inundate a user. The changes of phases P are equivalent to shifting the times of such reminders or inserting small time buffers that shift the timing of such reminders. The amount of phase shifts can be computed from $Ps=f(imp, other)$, where Ps is a phase shift, "imp" is the importance of a particular reminder, and "other" is the number of competing reminders within a time interval.

Accordingly, as detailed further herein, aspects of the invention include using machine-learning to learn and adaptively modify a user model, reflecting the priorities, preferences, and needs of a particular user. Specifically, at least one embodiment of the invention includes modeling the short- and intermediate-term memory needs for refreshing in the user's memory important and/or urgent information at particular points in time together with the priority and value associated with these needs relative to other ongoing work and needs. The model can then be used to determine the frequency and intensity or amplitude of the associated reminders.

Learning a user model includes identifying the need for a reminder, as well as quantifying the "risk of forgetting" associated with the reminder, and translating that risk into a frequency. Learning a user model also includes quantifying the "interruption risk" associated with the reminder, and translating that risk into a phase shift.

To achieve these tasks, at least one embodiment of the invention includes implementing an active learning component to allow the system to query the user to clarify his or her priorities when insufficient confidence exists about when to schedule a reminder. For example, the system may seek input on how likely the reminded information would be forgotten over some period of time, and what the impact of forgetting would be. The system may also seek clarification on a recent reminder, gathering input on whether it was too disruptive. Finally, the system may inquire about the overall structure of future reminders. This component can be based, for example, on a utility elicitation approach such as used in machine learning and decision analysis.

Additionally, at least one embodiment of the invention includes incorporation of user interfaces to combine visual and auditory means of interaction. For example, the internals of such a reminder system can be transformed into a visual activity heat map, representing the user's current scheduled reminders. The transformation may include a spectral analysis of reminder parameters (period, phase, intensity). By translating reminders into this form, the user's (short- and long-term) activities, goals, and tasks may be represented in different colors and in a single display to provide situational awareness, thus allowing the user to better respond to active learning inquiries by quickly evaluating the value of reminding about potentially less-urgent, but long-term important goals. In addition, such a view could be reported back to a third party (such as, for example, the user's manager) or anonymously to an aggregation system to analyze and/or enhance organizational efficiency.

Accordingly, as described herein, at least one embodiment of the invention takes a set of inputs, processes the inputs using a set of internal mechanisms, and produces a set of outputs. Example inputs can include a user voice command, a user's standard interface inputs (mouse, keyboard, touch screen, etc.), physiological measure of a user (skin conductance, etc.), inputs from a model of the user/user profile, communication links from other instances of the techniques run by other users, and inputs from other scheduling/time management devices and applications (resident or through the Internet).

Example internal mechanisms of at least one embodiment of the invention can include an internal timekeeper associated with each reminder, whose period or unit interval adjusts based on inputs, a reminder initiator which creates periodic reminders based on analysis of inputs, and a reminder scheduler that associates a specific reminder with a period and a phase. Further, example internal mechanisms can also include a coupling element that allows inputs to adjust the periods and phases of a reminder timekeeper and its reminders, a machine-learning element that updates the current reminders and the model of the user based on the inputs, and an active-learning and/or utility-elicitation component that can query a user to provide additional information about potential and existing reminders and associated timing.

Additionally, example outputs can include a visual display of upcoming or pending reminders that associates urgency, need, and proximity in time with a visual dimension such as color, size, contrast, and/or depth cues. Example outputs can also include a reminder notice that brings to the foreground a specific reminder, either visually or by an auditory or tactile cue. Further, example outputs can additionally include updates to a model of the user/user profile, communication links to other instances of the techniques run by other users, and outputs to other scheduling/time management devices and applications.

As noted above, at least one embodiment of the invention includes a set of internal timekeepers which drive user reminder cycles. A user reminder cycle varies according to free parameters which adapt to each user's personal work style, ongoing tasks, current work context, and other reminders of the user and/or other users. For example, people with intense, interruption-driven schedules (for example, an assistant) or intense short-term memory requirements (for example, a trader) may have parameters set to relatively shorter cycles, while people with longer-term schedules (for example, a delivery person) or longer-term memory requirements (for example, a librarian) may have these parameters set to relatively longer cycles. Adaptation occurs by means of machine learning over user inputs such as the addition of new reminders, physiological cues indicating overload, distress or unease, manual parameterization, and/or external inputs such as from a news or information source, an external schedule, or another instance of these techniques run by another user.

An individual interacts with the above-noted ongoing process in part by adding reminders to the system. This process may be initiated through a variety of methods, including the use of a voice or typed/tactile interface, and results in the system recognizing the additional reminder, analyzing the reminder, and inserting the reminder into the phase and period structure of existing reminders and notices. This phase structure may, in one or more embodiments of the invention, associate each reminder with a phase on a continuous phase interval $(0, 2*\Pi)$. Phases and periods may be changed continuously and by an arbitrary amount based on the changing user model and changing interactions from other reminders.

The process of changing the period and phase of the user reminder cycle may be carried out via mathematical techniques derived from models of nonlinear oscillators. The oscillation may speed up or slow down depending on inputs which attempt to pull the oscillator into a new regime through mathematically expressed interaction couplings. These changes in oscillator frequency result in a reminder occurring at a rate or interval now determined by the new oscillation. Accordingly, a person attempting to arrange a phone call with another person may allow his or her phone call reminder oscillator to synchronize and thereby adjust itself to the other persons' oscillator. As the oscillator adjusts, couplings to other user reminder cycles will result in changes in the periods and phases of the user's other planned reminders. Together, phase and period changes result in an overall reminder scheduler that is dynamic, and that can adapt to a user's ongoing schedule and activities.

Note that the system is "smart" in that it makes use of an analysis of the user's past use of system, an analysis of other users, and/or an analysis of the structure of current reminders and how each might compete for the user's attention. In at least one embodiment of the invention, such analysis is performed using a probabilistic model of a user and his/her environment, where the model is continuously updated within a reinforcement learning loop as described below.

By way of example, if a user has seven reminders with phases P1, P2, P3, P4, P5, P6, and P7, with frequencies F1, F2, F3, F4, F5, F6, and F7, and with amplitudes A1, A2, A3, A4, A5, A6, and A7, the system may compute a useful set of parameters to minimize collisions of reminders (for example, three reminders being triggered within a minute of one another). As used herein, the term amplitude refers to the strength of a reminder, where strength denotes a form of intensity. For example, an emergency meeting may be high intensity and may be vocalized or presented to the user in an audio form, while a low-intensity reminder may involve a meeting of little importance, which might be presented as blinking text on an electronic calendar application.

Minimizing collisions of reminders in the example from the previous paragraph could include, for instance, the following. Consider three reminders for tasks that need to be completed, with such reminders possibly falling within one minute of each other. In such a scenario, at least one embodiment of the invention may include changing the phases P with respect to such reminders so as not to inundate the user or possibly cause the user to overlook one of the reminders. As noted herein, the changes of phases P are equivalent to shifting the times of such reminders or inserting time buffers that shift the timing of such reminders.

FIG. 1 is a block diagram illustrating an example embodiment, according to an aspect of the invention. As depicted, addressing the learning tasks of user modeling, quantifying risks of forgetting tasks, and quantifying risks of interruption makes use of a reinforcement learning loop. In this respect, the system may enter the following cycle, as illustrated in FIG. 1.

The system operates in an environment which provides inputs. Two components of the environment include the user 104, providing commands using different interfaces (voice, mouse, keyboard, touch screen) as well as physiological measures such as skin conductance, electroencephalogram (EEG) inputs, etc., and an electronic environment 106 which includes the instances of the system run by other users, inputs from other scheduling programs, email system, etc. The system maps these inputs into a state of the user 104 and his/her electronic environment 106. The current state X is represented as a vector of state variables X=(X1, ... Xn). Herein, state variables can describe various types of tasks, with associated deadlines and priorities, that are on a current list of the user 104, and various aspects describing the user's state (for example, his or her mental and/or emotional state (tired, stressed, excited about particular topic/task, his/her attitude toward frequency of switching tasks, attitude towards multitasking, etc.).

As also depicted in FIG. 1, a learning agent 102 interacts with the environment and user 104 by, for example, obtaining inputs, which lead to updates in the observed states. The agent 102 uses the inputs and a model of the user 104 and environment that describes relationships among the state variables and helps to predict future (unobserved) states to decide on the next most appropriate action, such as issuing reminders about particular needs or events at particular times. A set of all possible actions at time T may be represented as A(T)={A1, ... , An}. Accordingly, the system makes decisions about which action to take and when to take such action. Actions can include, for example, setting a new reminder, deleting a reminder, or changing periodicity of a particular reminder to a more or less frequent. The system uses its internal model of the user, including his or her preference model, work-style model, etc., as well as the model of the environment, to decide on such action.

Additionally, the agent 102 receives feedback (reward) for taking each action in the form of a user's response specifying appropriateness of the current reminder. Such responses can include, for example, "thank you," "ignore," or "please do not distract me now." Also, the agent 102 can receive feedback on the long-term results from the electronic environment 106 (for example, other scheduling systems, emails, etc.) about the user's productivity (whether the tasks are being done on time, etc.).

Based on the feedback received, the system can modify its model of the user (for example, his/her preferences) and the environment so that in the future the system can take more appropriate actions (that is, actions that better improve some internally computed value function). A user's model can include, as an example, a probabilistic graphical model such as a Bayesian network. The agent 102 adaptively updates (learns) the model of the user and environment based on the feedback, comparing the actual feedback with predictions made by the system (for example, the model predicted the need for an increased frequency of a reminder (and implemented the same), but the corresponding feedback was highly negative, which indicates that the user's model is to be updated.

Additionally, if the system realizes that a current model is insufficient to decide on a particular action, the system can use an active learning or exploration step to elicit more information from a user and/or the environment.

As noted above, at least one embodiment of the invention can include user and environment models in the form of probabilistic graphical models. As such, an approach to addressing the learning tasks described above can make use of a Bayesian approach to making inferences from data, and updating a current model accordingly. Bayesian reasoning is a probabilistic approach to inference based on combining prior knowledge with observed data using the Bayes rule:

$$P(H \mid D) = \frac{P(D \mid H)P(H)}{P(D)},$$

where P(H) is the prior probability of hypothesis H, P(D) is the prior probability of observing data D, P(D|H), called the likelihood, is the probability of observing D if hypothesis H holds, and P(H|D) is the posterior probability of H after observing data D.

One framework for Bayesian reasoning includes graphical probabilistic models such as Bayesian networks. Bayesian networks, also called belief networks, provide a graphical framework for compact representation of multivariate probabilistic distributions and for efficient reasoning techniques. A Bayesian network is a directed acyclic graph where the nodes represent random variables of interest (for example, the current mode of operation of a user; that is, multi-tasking versus a focus on a single task requiring no interruption until a deadline) and the edges denote probabilistic dependencies among the variables. More specifically, each node/variable is associated with a conditional probability given its parents in the network, that is, the nodes directly pointing to that node (below, Xi denote nodes, and Pa(i) denote the set of node's parents): $P(x_1, \ldots, x_n) = \Pi_{i=1}^{n} P(x_i \mid pa_i)$.

Given the dataset D as a collection of observations over the variables X1, ..., Xn, at least one embodiment of the invention can include learning/updating the parameters (probabilities) and the structure of a Bayesian network using standard algorithmic procedures.

Once the probabilistic graphical model is available, probabilistic inferences can be made to predict unobserved variables from observed ones. For example, at least one embodiment of the invention can make an inference such as "compute the probability distribution P(delay|stress level) of a delay until the next reminder of a given type," provided the current stress level of the user, etc. Accordingly, the most likely value (mode of the distribution) can be selected as an appropriate delay.

As also noted above, at least one embodiment of the invention includes active learning. If, for example, in a probabilistic method, the computed probability distribution is too uncertain (that is, the probability of even the most-likely answer is lower than some threshold, referred to herein as a confidence level) or, alternatively, the entropy of the distribution is too high, then the system realizes that it does not have enough information to make a sufficient decision about its next action, and requests more information from the user.

An active learning component is based on information-theoretic techniques that evaluate several possible requests for getting additional information based on how informative the requests are with respect to the variable of interest. For example, if the variable of interest, Y, is the proper amount of delay before the next reminder for a given task A, and the current probability distribution P(delay(A)) is too uncertain (the entropy H(Y) is too high), then the system may need to request more information from the environment and/or from the user about the variables that affect the Y=delay(A) variable in the model. Accordingly, at least one embodiment of the invention includes evaluating each variable Z with respect of the expected decrease in the entropy of Y that Z can provide, that is, the mutual information I(Y:Z), and selecting the most-informative Z about which to send a request.

Also, in at least one embodiment of the invention, an amelioration action can be determined and executed if a reminder is not effective. For example, an amelioration action can include an automated recording of a television broadcast (in the situation where the reminder to the user to manually record the broadcast was missed or ignored). Additionally, for example, an amelioration action in the case of a reminder to a user with respect to taking a medication can include contacting (via phone, email, text, etc.) a caretaker when the system determines that a pill or medication is not being taken based on, for instance, readings from a smart pill bottle. Also, amelioration actions can be implemented as an automatic triggering of actions when reminders are not being seen because a user is away from certain devices.

Figure 2:
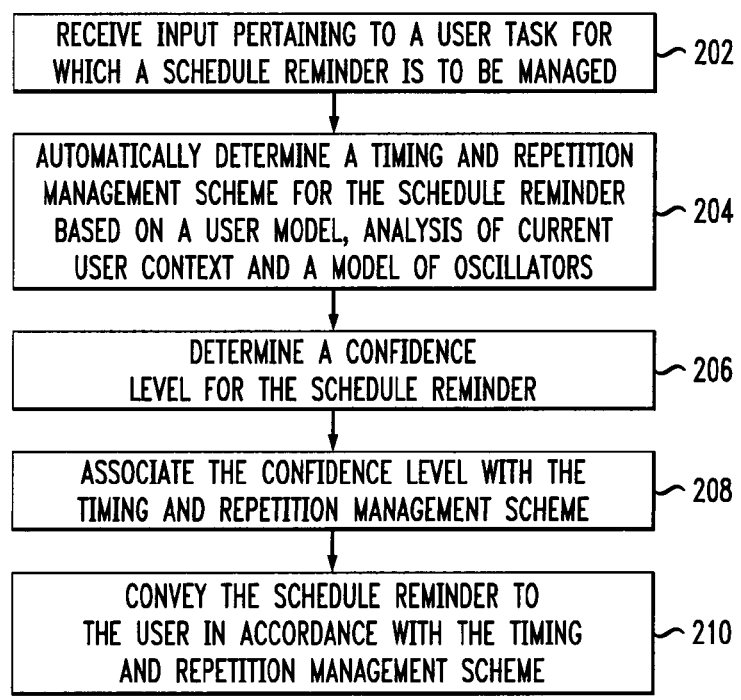
FIG. 2 is a flow diagram illustrating techniques for automatically managing a schedule reminder, according to an embodiment of the invention.

FIG. 2 is a flow diagram illustrating techniques for automatically managing a schedule reminder, according to an embodiment of the present invention. Step 202 includes receiving input pertaining to a user task for which a schedule reminder is to be managed. The input can include a user voice command, a user interface input, a physiological measure of the user, the user model, a communication link from a timing and repetition management scheme for a separate task, and/or a communication link from a timing and repetition management scheme for a separate user.

Step 204 includes automatically determining a timing and repetition management scheme for the schedule reminder based on a user model, analysis of current user context and a model of oscillators. The timing and repetition management scheme can include a determined delay time for the schedule reminder. Additionally, the current user context can include other schedule reminders for the user. Automatically determining a timing and repetition management scheme for the schedule reminder can additionally be based on models of other users (for example, users of a similar demographic to the user). Also, the user model can include information pertaining to a user characteristic, a user preference, a user limitation, etc.

Additionally, the timing and repetition management scheme can be further based on an analysis of the user's past use of timing and repetition management scheme, an analysis of other tasks and/or reminders currently competing for the user's attention, and/or an analysis of other tasks and/or reminders forecast to be competing for the user's attention.

Step 206 includes determining a confidence level for the schedule reminder. Step 208 includes associating the confidence level with the timing and repetition management scheme.

Step 210 includes conveying the schedule reminder to the user in accordance with the timing and repetition management scheme. Conveying the schedule reminder to the user can include conveying a visual display of the schedule reminder that associates urgency, need, and/or proximity in time with a visual dimension. The visual dimension can include, for example, color, size, contrast, and/or a depth cue. Also, conveying the schedule reminder to the user can include conveying an audio signal to the user.

The techniques depicted in FIG. 2 can additionally include quantifying a risk of forgetting the task associated with the schedule reminder, and translating the risk of forgetting the task into a frequency. Similarly, the techniques depicted in FIG. 2 can also include quantifying an interruption risk for the task associated with the schedule reminder, and translating the interruption risk into a phase shift.

Further, at least one embodiment of the invention can include automatically triggering an amelioration action in response to an ineffective schedule reminder conveyance. As detailed herein, an aspect of the invention also includes adjusting the timing and repetition management scheme for the schedule reminder based on additional inputs.

Further, the techniques depicted in FIG. 2 can also include implementing an active-learning component to query user to provide additional information about at least one of a potential scheduler reminder and an existing schedule reminder.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 3:
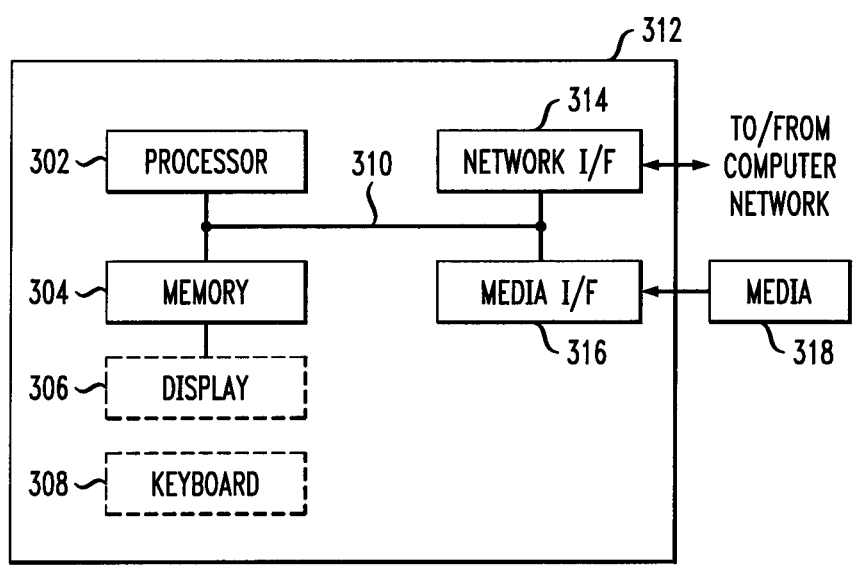
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, determining schedule reminder delays and periodicity automatically with confidence levels determined using inference in probabilistic models and information-theoretic computations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory article of manufacture comprising a computer readable storage medium having computer readable instructions tangibly embodied thereon which, when implemented, cause a computer to carry out a plurality of method steps comprising:

receiving input pertaining to a user task for which a schedule reminder is to be managed;

automatically determining a timing and repetition management scheme for the schedule reminder based on (i) a user model that associates a value with each of multiple needs of the user relative to each of the other multiple needs of the user, (ii) analysis of current user context and (iii) a model of coupled nonlinear oscillators, wherein:

one or more oscillators in said model of coupled nonlinear oscillators adjust in connection with said received input from the user via a user interface, thereby dynamically altering the timing and repetition management scheme based on a coupling interaction with the one or more other oscillators in said model of coupled nonlinear oscillators; and one or more oscillators in said model of coupled nonlinear oscillators adjust in connection with an oscillator associated with one or more additional users corresponding to the task for which the schedule reminder is to be managed, thereby dynamically altering the timing and repetition management scheme by synchronizing the one or more oscillators in said model of coupled nonlinear oscillators with the oscillator associated with the one or more additional users;

determining a confidence level for the schedule reminder based on one or more probabilistic models and one or more information-theoretic computations;

requesting from the user one or more items of information pertaining to the schedule reminder if the confidence level is below a threshold;

associating the confidence level with the timing and repetition management scheme; and conveying the schedule reminder to the user in accordance with the timing and repetition management scheme.

2. The article of manufacture of claim 1, wherein the timing and repetition management scheme is further based on an analysis of the user's past use of a timing and repetition management scheme, an analysis of other tasks and/or reminders currently competing for the user's attention, and/or an analysis of other tasks and/or reminders forecast to be competing for the user's attention.

3. The article of manufacture of claim 1, wherein the method steps comprise:

quantifying a risk of forgetting the task associated with the schedule reminder; and translating the risk of forgetting the task into a frequency.

4. The article of manufacture of claim 1, wherein the method steps comprise:

quantifying an interruption risk for the task associated with the schedule reminder; and translating the interruption risk into a phase shift.

5. The article of manufacture of claim 1, wherein the input comprises a user voice command.

6. The article of manufacture of claim 1, wherein the input comprises a user interface input.

7. The article of manufacture of claim 1, wherein the input comprises a physiological measure of the user.

8. The article of manufacture of claim 1, wherein the input comprises the user model.

9. The article of manufacture of claim 1, wherein the input comprises a communication link from a timing and repetition management scheme for a separate task.

10. The article of manufacture of claim 1, wherein the input comprises a communication link from a timing and repetition management scheme for a separate user.

11. The article of manufacture of claim 1, wherein the timing and repetition management scheme for the schedule reminder comprises a determined delay time for the schedule reminder.

12. The article of manufacture of claim 1, wherein the current user context comprises other schedule reminders for the user.

13. The article of manufacture of claim 1, wherein automatically determining a timing and repetition management scheme for the schedule reminder is further based on models of other users of a similar demographic to the user.

14. The article of manufacture of claim 1, wherein the user model comprises information pertaining to at least one of a user characteristic, a user preference, and a user limitation.

15. The article of manufacture of claim 1, wherein conveying the schedule reminder to the user comprises conveying a visual display of the schedule reminder that associates at least one of urgency, need, and proximity in time with a visual dimension.

16. The article of manufacture of claim 15, wherein the visual dimension comprises at least one of color, size, contrast, and a depth cue.

17. The article of manufacture of claim 1, wherein conveying the schedule reminder to the user comprises conveying an audio signal to the user.

18. The article of manufacture of claim 1, wherein the method steps comprise:

automatically triggering an amelioration action in response to an ineffective schedule reminder conveyance.

19. The article of manufacture of claim 1, wherein the method steps comprise:

adjusting the timing and repetition management scheme for the schedule reminder based on additional inputs.

20. A system for automatically managing a schedule reminder, comprising:

at least one distinct software module, each distinct software module being embodied on a tangible computer-readable medium;

a memory; and at least one processor coupled to the memory and operative for:

receiving input pertaining to a user task for which a schedule reminder is to be managed;

automatically determining a timing and repetition management scheme for the schedule reminder based on (i) a user model that associates a value with each of multiple needs of the user relative to each of the other multiple needs of the user, (ii) analysis of current user context and (iii) a model of coupled nonlinear oscillators, wherein:

one or more oscillators in said model of coupled nonlinear oscillators adjust in connection with said received input from the user via a user interface, thereby dynamically altering the timing and repetition management scheme based on a coupling interaction with the one or more other oscillators in said model of coupled nonlinear oscillators; and one or more oscillators in said model of coupled nonlinear oscillators adjust in connection with an oscillator associated with one or more additional users corresponding to the task for which the schedule reminder is to be managed, thereby dynamically altering the timing and repetition management scheme by synchronizing the one or more oscillators in said model of coupled nonlinear oscillators with the oscillator associated with the one or more additional users;

determining a confidence level for the schedule reminder based on one or more probabilistic models and one or more information-theoretic computations;

requesting from the user one or more items of information pertaining to the schedule reminder if the confidence level is below a threshold;

associating the confidence level with the timing and repetition management scheme; and conveying the schedule reminder to the user in accordance with the timing and repetition management scheme.

* * * * *